May 20, 1924.
R. D. MOCK
ROLLER FOR WARDROBE TRUNKS
Filed July 13, 1923
1,495,093
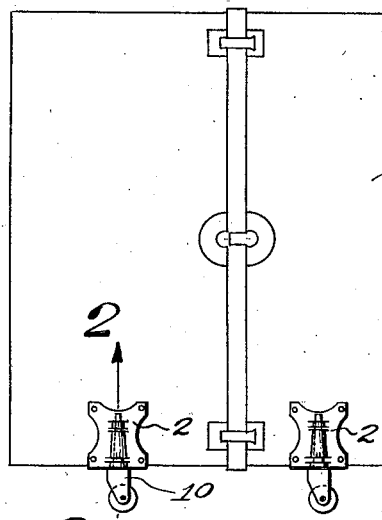
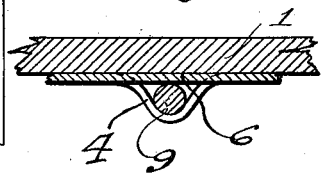
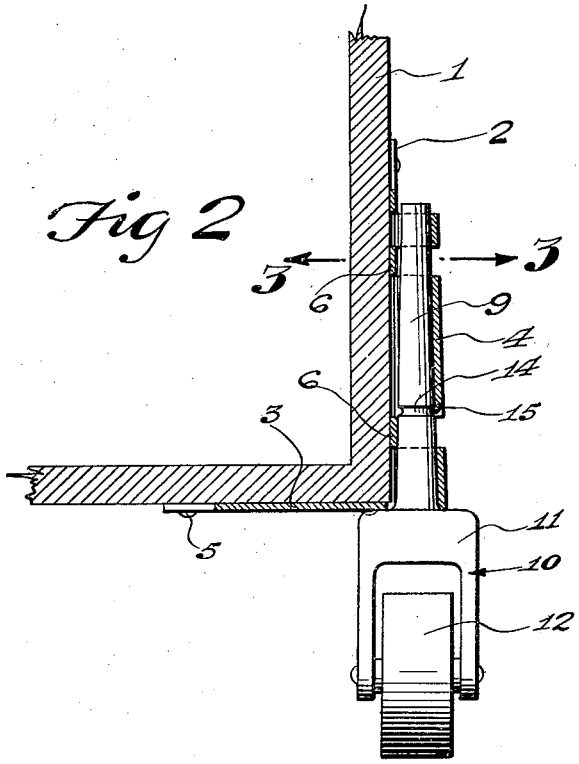
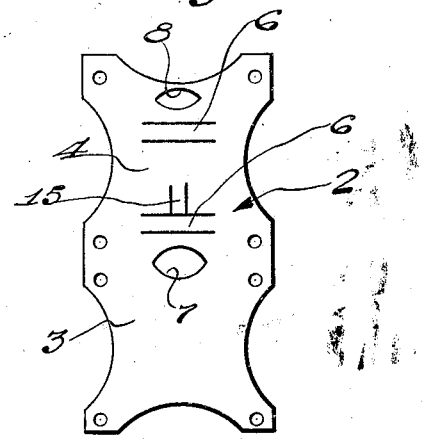
Ralph D. Mock
INVENTOR
BY Victor J. Evans
ATTORNEY Patented May 20, 1924.

1,495,093

UNITED STATES PATENT OFFICE.

RALPH D. MOCK, OF TULSA, OKLAHOMA.

ROLLER FOR WARDROBE TRUNKS.

Application filed July 13, 1923. Serial No. 651,373.

*To all whom it may concern:*

Be it known that I, RALPH D. MOCK, a citizen of the United States, residing at Tulsa, in the county of Tulsa and State of Oklahoma, have invented new and useful Improvements in Rollers for Wardrobe Trunks, of which the following is a specification.

This invention relates to roller attachments for wardrobe trunks, and an object of the invention is to provide a construction whereby casters or rollers may be quickly and easily attached to a wardrobe trunk to facilitate the movement of the trunk, or the opening or closing of the trunk.

Wardrobe trunks are frequently used especially in hotels or like places in lieu of dressers or closets, particularly when the owner is making a comparatively short stay and owing to the size and weight of this type of trunk it is comparatively difficult, for the owner especially a woman to open or close the trunk or move it about.

Other objects of the invention will appear in the following detailed description taken in connection with the accompanying drawings.

Fig. 1 is a side elevation of a trunk showing the improved rollers attached thereto.

Fig. 2 is an enlarged detail section taken on the line 2—2 of Fig. 1.

Fig. 3 is a section on the line 3—3 of Fig. 2.

Fig. 4 is a plan view of the blank used in attaching the rollers to a trunk.

Referring more particularly to the drawings, the wardrobe trunk 1 may be of any approved type and it has caster or roller carrying plates 2 attached thereto at its lower corners. The plates 2 comprise right angularly bent portions 3 and 4 the former of which is fastened by rivets 5 to the bottom of the trunk 1. The angled portion 4 is attached to the side of the trunk 1 and it has a pair of straps 6 cut therefrom and extending transversely of the plate. The plate 2 is provided with substantially oval shaped openings 7 and 8 one at the lower corner of the plate and the other adjacent the upper edge of the plate and the portions of the plate intermediate the openings 7 and 8 and straps 6 and the portions between the straps are bulged outwardly, as clearly shown in Figs. 1 and 2 of the drawings to form sockets for receiving the stem 9 of the caster wheel or roller 10. Particular attention is directed to the fact that the straps 6 are bulged inwardly in a direction opposite the other bulged portions whereby to form suitable bearings for the stem 9. The caster wheel or roller 10 may be of any approved construction comprising the stem 9, the lower end of which is forked as shown at 11 and has a roller 12 rotatably carried thereby. The stem 9 is provided with an annular groove 14, and a tongue 15 is cut from the plate 2 and is bent inwardly for spring engagement in the annular groove 14 to prevent accidental disconnection of the roller and the trunk. The tongue 15, is however, relatively weak so that the caster may be easily removed when it is desired to ship the trunk and may be easily placed in its socket when it is desired to use the trunk as a wardrobe.

It is, of course, to be undertsood that the invention may be constructed in other manners and the parts associated in different relations and, therefore, I do not desire to be limited in any manner except as set forth in the claims hereunto appended.

Having thus described my invention what I claim is:

1. A device of the character described including a body plate having its ends disposed at right angles to each other, one of said angular portions having spaced parallel straps cut from a portion thereof, said straps being bulged laterally with respect to the body from one side thereof and the material between the straps and between each end of the body and said straps being bulged in a direction opposite to the straps to form bearing sockets, caster rollers including stems fitted into said bearing sockets, and means yieldably retaining said stems within the sockets.

2. A device of the character described including a body plate having its ends disposed at right angles to each other, one of said angular portions having spaced parallel straps cut from a portion thereof, said straps being bulged laterally with respect to the body from one side thereof and the material between the straps and between each end of the body and said straps being bulged in a direction opposite to the straps to form bearing sockets, caster rollers including stems fitted into said bearing sockets, said stem having an annular groove, and a spring tongue cut from the material between said straps and engaging said groove.

In testimony whereof I affix my signature.

RALPH D. MOCK.